United States Patent
Kim

Patent Number: 6,105,143
Date of Patent: Aug. 15, 2000

[54] POWER CONTROL DEVICE AND METHOD OF CONTROLLING POWER OF PERIPHERAL DEVICES OF A COMPUTER SYSTEM USING A UNIVERSAL SERIAL BUS (USB) HUB

[75] Inventor: Hong-Ki Kim, Kyungki-do, Rep. of Korea

[73] Assignee: SamSung Electronics Co., Ltd., Suwon, Rep. of Korea

[21] Appl. No.: 09/063,928

[22] Filed: Apr. 22, 1998

[30] Foreign Application Priority Data

Apr. 22, 1997 [KR] Rep. of Korea ............... 97/14829

[51] Int. Cl.⁷ ............................................. G06F 1/32
[52] U.S. Cl. ................................ 713/324; 713/340
[58] Field of Search ........................... 713/300–340, 713/600–601; 345/211, 212; 710/2, 100–101, 126–130

[56] References Cited

U.S. PATENT DOCUMENTS

| | | | |
|---|---|---|---|
| 5,384,721 | 1/1995 | Joto | 713/321 |
| 5,408,668 | 4/1995 | Tornal | 713/324 |
| 5,410,713 | 4/1995 | White et al. | 713/330 |
| 5,483,464 | 1/1996 | Song | 713/300 |
| 5,652,893 | 7/1997 | Ben-Meir et al. | 713/310 |
| 5,652,895 | 7/1997 | Poisner | 713/322 |
| 5,675,813 | 10/1997 | Holmdahl | 713/310 |
| 5,696,978 | 12/1997 | Nishikawa | 713/324 |

*Primary Examiner*—Ayaz R. Sheikh
*Assistant Examiner*—Sumati Lefkowitz
*Attorney, Agent, or Firm*—Robert E. Bushnell, Esq.

[57] ABSTRACT

A power control device of a computer system uses a universal serial bus (USB) hub for power control of a display monitor. The power control device includes: a rectifying section for converting an AC power of the display device into a DC voltage; a main SMPS (Switching Mode Power Supply) for supplying power to the display monitor after the DC voltage is switched and rectified; a microcomputer for determining the status of a power save mode to control the switching operation of the main SMPS; an auxiliary SMPS for supplying the power to the microcomputer when no power has been supplied from the USB hub; an auxiliary OFF controller for interrupting the operation of the auxiliary SMPS when the power has been applied from the USB hub; and an OFF controller for interrupting the operation of the main SMPS to execute a power OFF mode according to a DPMS.

16 Claims, 5 Drawing Sheets

POWER CONTROL DEVICE AND METHOD OF CONTROLLING POWER OF PERIPHERAL DEVICES OF A COMPUTER SYSTEM USING A UNIVERSAL SERIAL BUS (USB) HUB

CLAIM FOR PRIORITY

This application makes reference to, incorporates the same herein, and claims all benefits accruing under 35 U.S.C. §119 from an application for DEVICE FOR AND METHOD OF CONTROLLING POWER OF DISPLAY DEVICE USING POWER OF USB HUB earlier filed in the Korean Industrial Property Office on the $22^{nd}$ of April 1997, and there duly assigned Serial No. 14829/1997, a copy of which application is annexed hereto.

BACKGROUND OF THE INVENTION

1. Technical Field

The present invention relates to a power control device of a computer system and method of power control of peripheral devices using a universal serial bus (USB) hub, and more particularly, relates to a power control device and method of controlling the power of a display device, which is adapted to minimize the power consumption of the display device by supplying the power to the display device through the USB hub.

2. Related Art

Contemporary computer systems generally consist of a main unit (which may have built-in storage devices such as floppy disks, hard disks and CD-ROM), a keyboard and a monitor. The main unit may be connected to a monitor and other peripheral devices such as an input keyboard, an input mouse, a telephone and a printer.

There were a number of drawbacks of using different peripheral devices via the computer system. The first drawback was the difficulty of conserving valuable energy resources when different peripheral devices are connected to the computer system. As a result, power saving features for typical computer systems were developed to conserve valuable energy resources as disclosed, for example, in U.S. Pat. No. 5,384,721 for Information Processing System With A Power Control Unit issued to Joto, U.S. Pat. No. 5,408,668 for Method And Apparatus For Controlling The Provision Of Power To Computer Peripherals issued to Tornai, U.S. Pat. No. 5,410,713 for Power-Management System For A Computer issued to White et al., U.S. Pat. No. 5,483,464 for Power Saving Apparatus For Use In Peripheral Equipment Of A Computer issued to Song and assigned to the same assignee of the present invention, and U.S. Pat. No. 5,696,978 for Personal Computer For Performing Power Save Operation Of An External CRT By Determining A DPMS-Compliant CRT issued to Nishikawa.

The second drawback was that each peripheral device has a unique connector which may not be interchangeable with the computer system. Therefore, the computer system must contain a large number of interface cards for connection with the peripheral devices. Each peripheral device must be carefully plugged into a corresponding connector of the interface card on the computer for operation. To relieve the cable congestion and reduce the number of connectors contained in the computer, a data hub which serves as a central connection point of the computer system for power and data distribution to all peripheral devices was suggested. A universal serial bus (USB) is widely used to provide such a data hub as disclosed, for example, in U.S. Pat. No. 5,675,813 for System And Method For Power Control In A Universal Serial Bus issued to Holmdahl. While the USB hub permits the computer system to conveniently control power distribution over different peripheral devices, I have observed that there is no effective way to conserve and minimize the power distribution in such a computer system using the USB hub.

SUMMARY OF THE INVENTION

Accordingly, it is therefore an object of the present invention to provide a power control device of a computer system and method of power saving control of peripheral devices.

It is also an object to provide a power control device of a computer system which uses a universal serial bus (USB) hub to minimize power consumption of peripheral devices such as a display monitor.

It is further an object to provide a power control device of a computer system and method of controlling the power of a display monitor according to display power management signaling (DPMS) mode standards set by the computer system to save power consumption using a universal serial bus (USB) hub.

These and other objects of the present invention can be achieved by a power control device of a computer system using a universal serial bus (USB) hub for power control of a display monitor. The power control device is comprised of a rectifier for converting an AC power of the display monitor into a DC voltage, a main switching mode power supply (SMPS) unit for supplying power to the display monitor after the DC voltage is switched and rectified, a microcomputer for discriminating a power save mode to control the switching operation of the main SMPS unit, an auxiliary switching mode power supply section (SMPS) unit for supplying power to the microcomputer when no power has been supplied from the USB hub, an auxiliary OFF controller for interrupting the operation of the auxiliary SMPS unit when power has been applied from the USB hub, and a main OFF controller for interrupting the operation of the main SMPS unit to execute a power OFF mode according to a display power management signaling (DPMS) mode.

In accordance with another aspect of the present invention, a power control method of a computer system using a universal serial bus (USB) hub for power distribution to peripheral devices is obtained by activating a main switching mode power supply (SMPS) unit and an auxiliary SMPS unit with power, determining whether power is supplied from a USB port to a display monitor, interrupting operation of the auxiliary SMPS unit when the power of the USB hub is supplied, determining whether to use a power OFF mode, and switching the main SMPS unit off and supplying the power of a specified level to a microcomputer through the USB port in order to use the power OFF mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
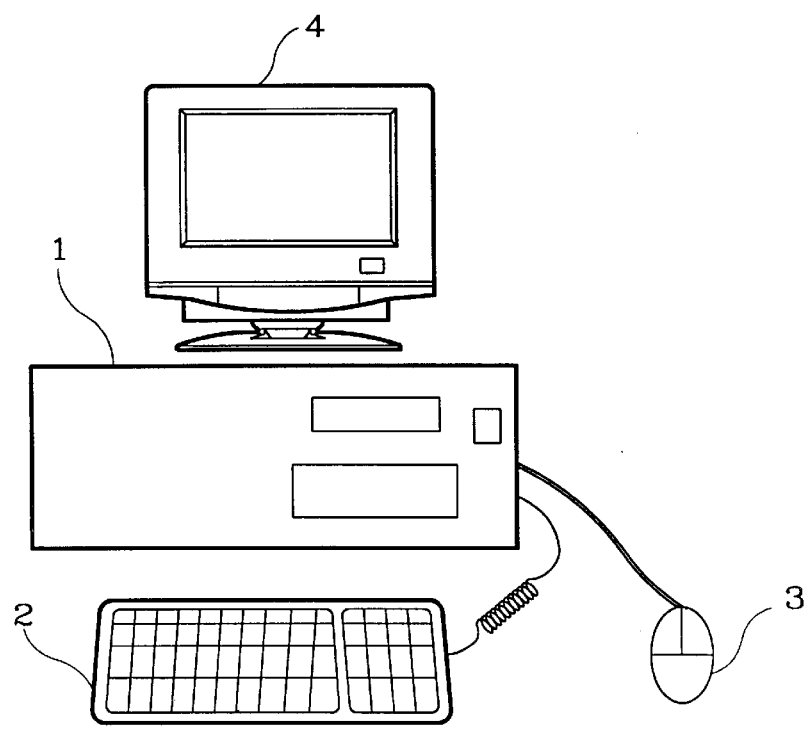
FIG. 1 is a schematic view of a typical computer system.

Referring now to the drawings and particularly to FIG. 1, which illustrates a typical computer system comprising a main unit 1 and peripheral devices such as a keyboard 2, a mouse 3, and a display monitor 4 connected to the main unit 1. Each respective peripheral device has a port available via an occupied one of slots on the mother board of the main unit 1. Typically, the user has to open the main unit 1 and insert an interface card in a corresponding slot on the mother board. On occasion, the user must operate a switch, set a jumper, or arrange the types of connectors (such as serial or parallel) appropriate for the peripheral devices. Sometimes it is impossible for the user to connect the peripheral devices to the computer system because of a limited number of slots available on the mother board of the main unit 1.

Figure 2:
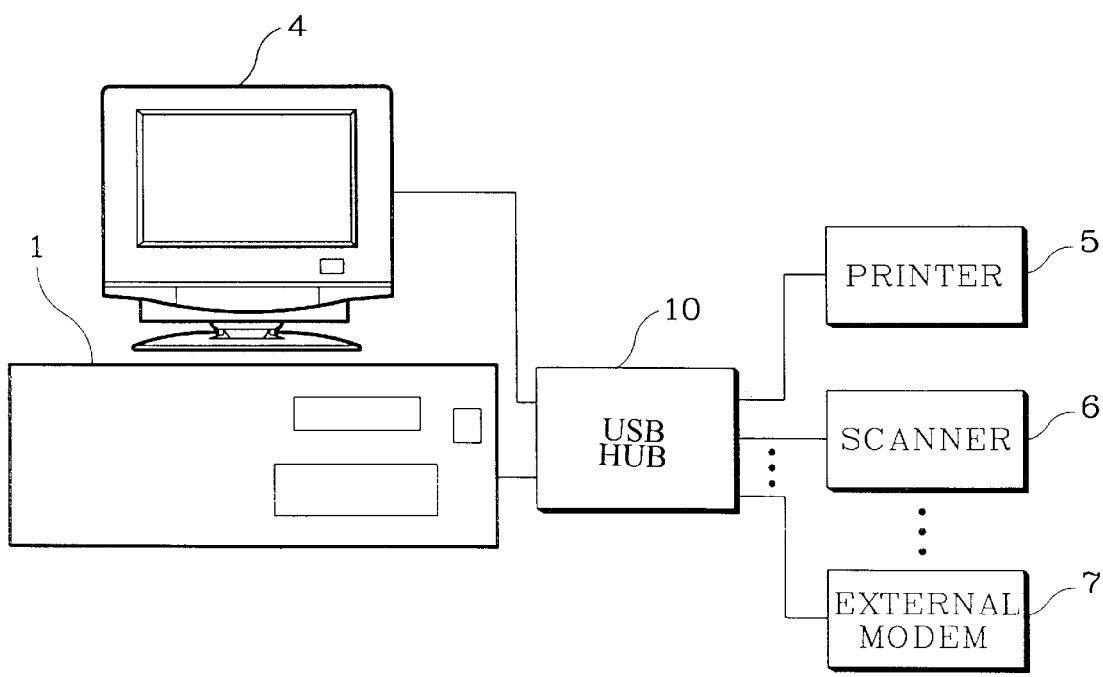
FIG. 2 is a schematic view of a computer system using a universal serial bus (USB) hub for power distribution to peripheral devices.

To reduce the number of interface cards and slots available on the mother board of the main unit 1 of the computer system, a universal serial bus (USB) hub which serves as a central connection point of the computer system for power and data distribution to all peripheral devices has been suggested to conveniently control power distribution over different peripheral devices. FIG. 2 illustrates a universal serial bus (USB) hub 10 for connecting all peripheral devices, such as a display monitor 4, a printer 5, a scanner 6 and an external modem 7, to a main unit 1 of the computer system. The keyboard 2 and display monitor 4 may be connected directly to the computer main unit 1. The USB hub 10 allows the user to install all other peripheral devices or their related cards to the computer system without having to open the computer main unit 1 for interface card installation. The USB hub 10 provides connections between the computer main unit 1 and up to 127 peripheral devices, and supplies an operational voltage of only 5 volts to the respective peripheral devices without consuming a large DC voltage. In addition, the USB hub 10 has a data transmission rate of 12 Mbit/sec so that most peripheral devices of a large bandwidth can have large capacity at little expense relative to the cost of the current connector technique.

The USB hub 10 is now widely used by computer manufacturers, and is thus expected to become an important component of computer systems in the future. The peripheral devices to be connected to the USB hub 10 may include a telephone network, a modem, a printer, a microphone, a mouse, a scanner, a digital camera and so on. Simplicity and convenience are the major advantages of the USB hub. This is because the USB hub can sense the addition or removal of peripheral devices from the computer system without rebooting the system, even when power is still activated, unlike conventional built-in slots. In addition, the USB hub supports plug-and-play operations such that information relating to the source, e.g., driver software required for the respective peripheral devices, or bandwidth of the bus can be obtained automatically without intervention of the user.

Figure 3:
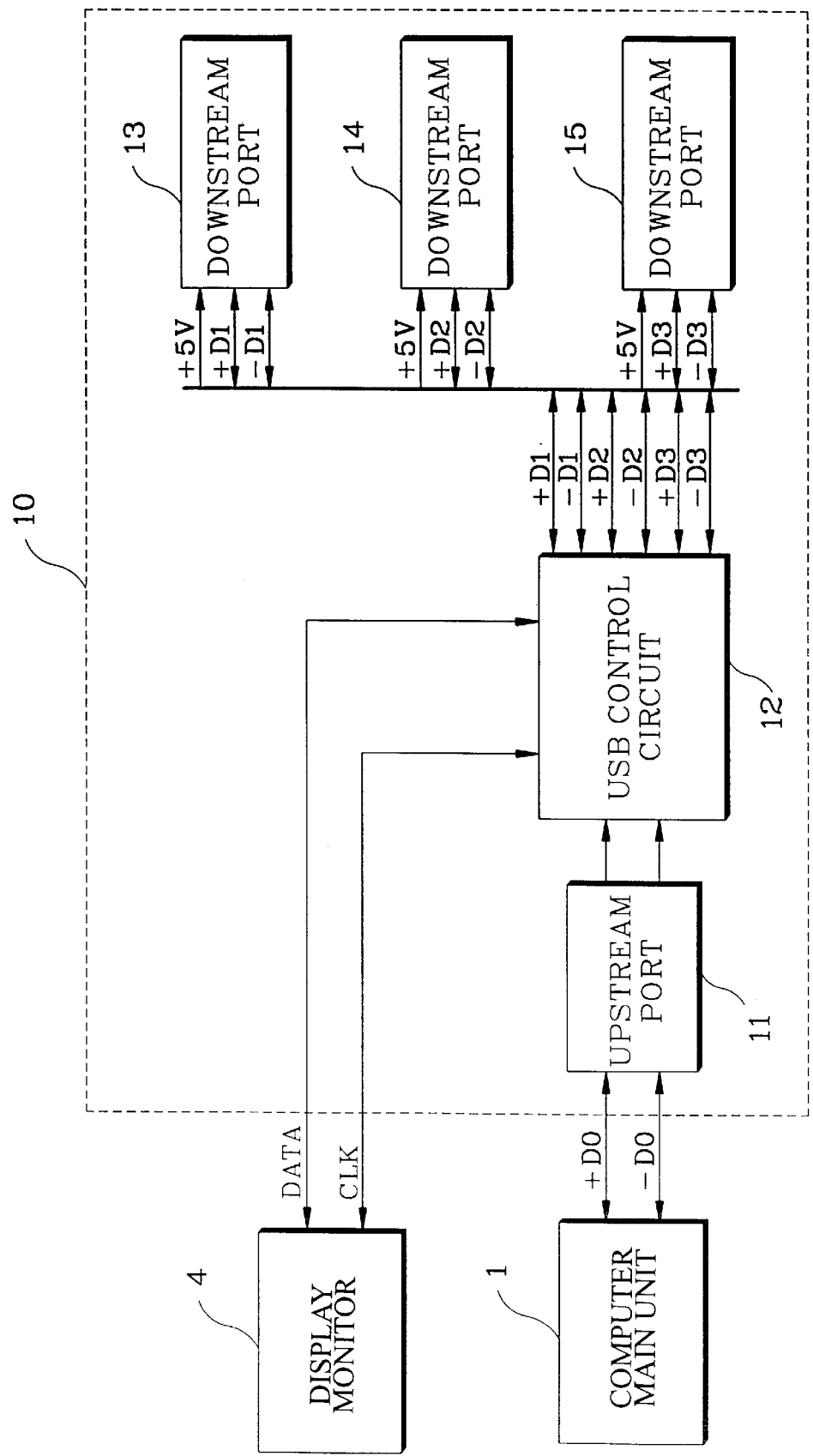
FIG. 3 is a detailed circuit diagram of a universal serial bus (USB) hub as shown in FIG. 2.

FIG. 3 illustrates a circuit diagram of the USB hub 10 for power distribution of a designated peripheral device such as a display monitor 4. The USB hub 10 includes an upstream port 11 to transmit data and clock received from a computer main unit 1, a USB control circuit 12 to control the mutual transmission of information between the display monitor 4 and other peripheral devices, and downstream ports 13–15 to send the control signal of the USB control circuit 12 to the respective peripheral devices 5–7 (FIG. 2).

The computer main unit 1 is constructed such that it supplies the USB control circuit 12 with an operational power of 5 volts and exchanges information and clocks mutually with the USB control circuit 12. The upstream port 11 of the USB hub 10 has a connection to the computer main unit 1, which is set for the use of USB hub 10 and supports the USB control environment automatically. Once the peripheral devices 5–7 are connected to the downstream ports 13–15 of the USB hub 10, the computer main unit 1 identifies the peripheral devices 5–7 and, if acceptable, installs the peripheral devices 5–7 automatically without separate action of the user.

Figure 4:
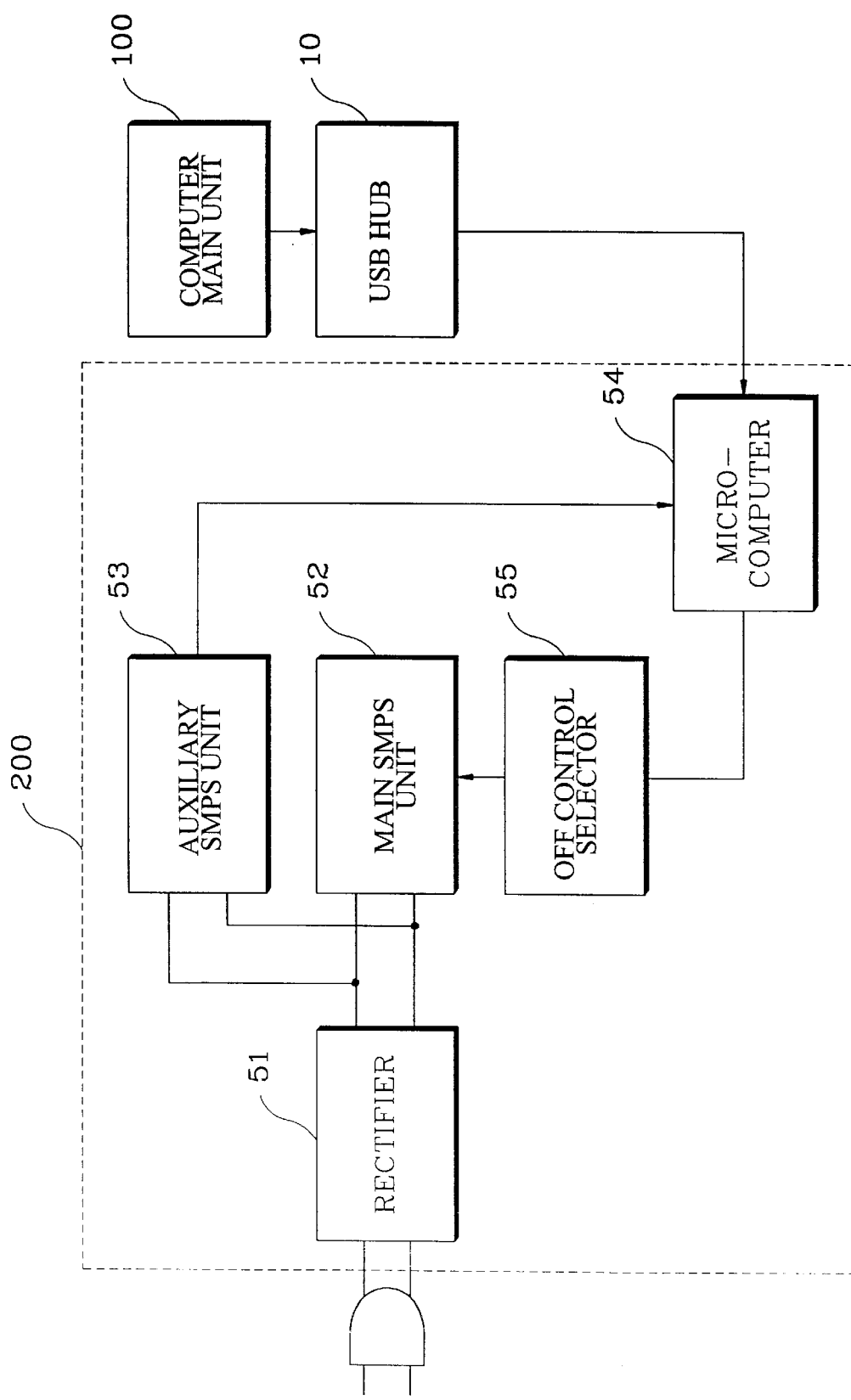
FIG. 4 is a schematic view of a power control device of the computer system using a universal serial bus (USB) hub.

FIG. 4 is a block diagram of a power control device 200 of a computer system for controlling the power of a display monitor 4 through a USB hub 10 . As shown in FIG. 4, the power control device 200 is comprises a rectifier 51 for converting an AC power to a DC voltage, a main switching mode power supply (SMPS) unit 52 and an auxiliary switching mode power supply (SMPS) unit 53 for supplying the power applied from the rectifier 51 to the respective circuit elements, a microcomputer 54 which is operated with the power of 5 volts supplied by the auxiliary SMPS unit 53, an OFF control selector 55 for controlling and selecting the power of the main SMPS unit 52 in response to the power control signal of the microcomputer 54, and a USB hub 10 for transmitting information from the computer main unit 100 to the microcomputer 54.

The display power management signaling (DPMS) modes are set to save power consumption by controlling monitor power with respect to the operational status of the computer system. In the DPMS mode, power supply is managed according to the operational status of the computer system. The mode status of the power management is classified into ON, STAND-BY, SUSPEND and OFF, which are represented in operational sequence. When the DPMS mode transferred from computer main unit 100 is applied to the microcomputer 54 via the USB port of the USB hub 10, the microcomputer 54 sends an OFF control signal to the main SMPS unit 52 so that the operation of the main SMPS unit 52 is interrupted for execution of an OFF mode.

However, as noted herein, the power supplied to the display monitor 4 in the computer system using the USB hub 10 cannot be economized effectively. This is because both the auxiliary SMPS unit 53 and the microcomputer 54 are still in a normal operation, and thereby consume valuable power, during a period when the main SMPS unit 52 is being suspended.

Figure 5:
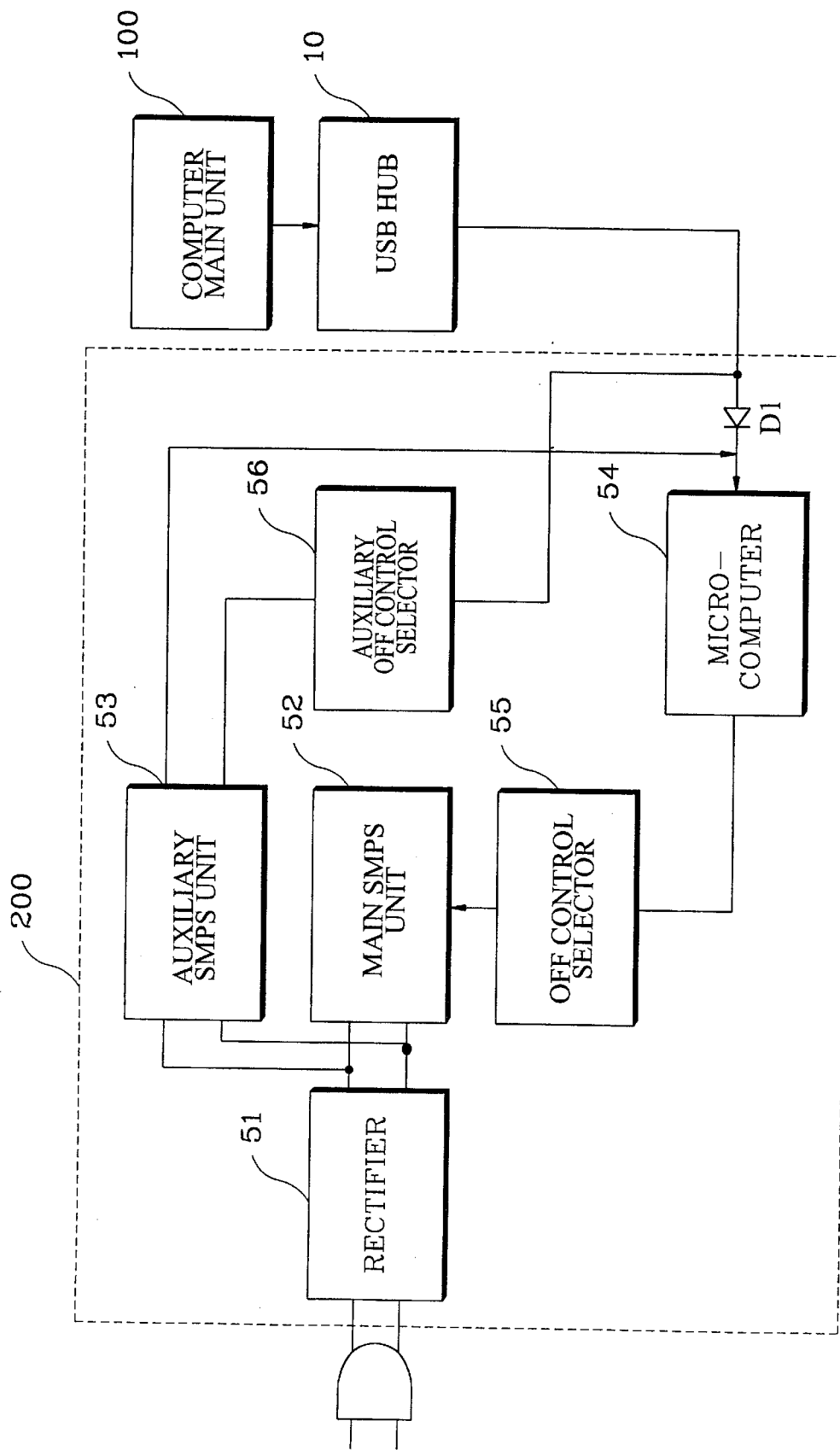
FIG. 5 is a schematic view of a power control device of a computer system using a universal serial bus (USB) hub according to the principles of the present invention.

FIG. 5 which illustrates a power control device 200 of a computer system for controlling the power supply to a display monitor 4 through a universal serial bus (USB) hub 10 according to the principles of the present invention. As shown in FIG. 5, the power control device 200 comprises of a rectifier 51 for converting an AC power of a display monitor 4 to a DC voltage through rectification, a main SMPS unit 52 for supplying the power rectified at the rectifier 51 to the respective circuit elements, an auxiliary SMPS unit 53 for supplying the power to the microcomputer 54 when no power has been supplied via a USB cable, a USB hub 10 for supplying the power of 5 volts from the computer main unit 100, a diode D1 for preventing the power of auxiliary SMPS unit 53 from affecting the power of USB hub 10, a microcomputer 54 for determining the status of a save power mode and generating a control signal to determine whether to activate an SMPS operation, an auxiliary OFF control selector 56 for switching the auxiliary SMPS unit 53 off when the power of 5 volts for driving the microcomputer 54 has been applied from the USB hub 10, and an OFF control selector 55 for interrupting the power of the main SMPS unit 52. The OFF control selector 55 and the auxiliary OFF control selector 56 may use switching devices in addition to transistors.

Figure 6:
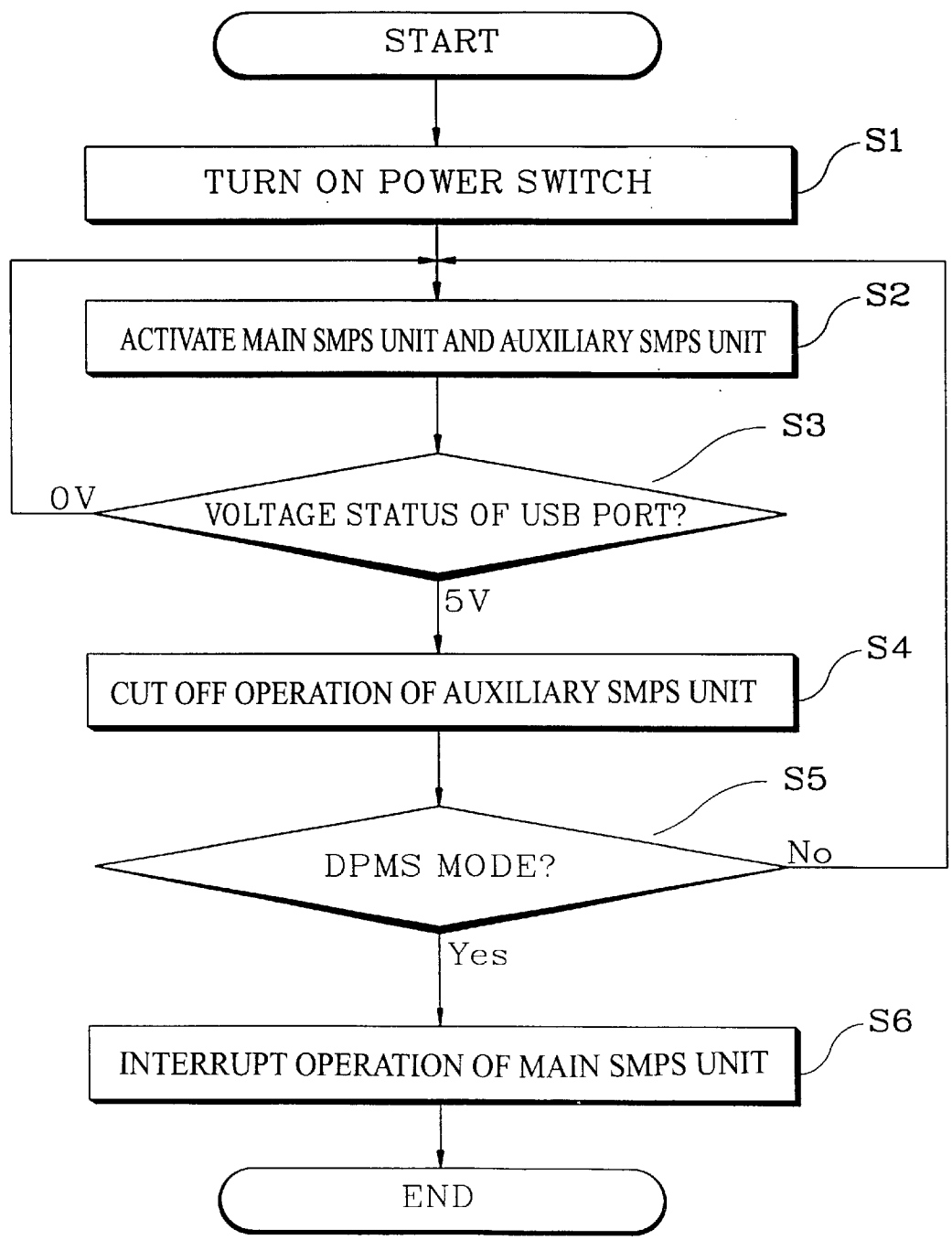
FIG. 6 is a flow chart of a process of controlling the power of a monitor by using a USB hub power according to the principles of the present invention.

Now, the operation of the power control device 200 of a computer system using a universal serial bus (USB) hub 10 to control the power supply to a display monitor 4 will be described in detail with reference to FIG. 6.

When the power switch of the display monitor 4 is turned on at step S1, the auxiliary SMPS unit 53 of the power control device 200 is activated via rectifier 51 of the monitor to supply the power to microcomputer 54. Then, main SMPS unit 52 is activated to supply the power to the entire circuit of the display monitor 4 at step S2. With a USB cable connected between USB hub 10 and the display monitor 4, the power of 5 volts for driving the microcomputer 54 is applied from the downstream port of USB hub 10 to the display monitor.

The moment that the USB hub 10 supplies the power of 5 volts to the display monitor 4 from the USB hub 10 (Step S3), the auxiliary OFF control selector 56 is activated with the power via the USB cable, suspending the operation of auxiliary SMPS unit 53 at step S4. Thus, the power of 5V supplied from the USB hub 10 will activate the microcomputer 54.

At this stage, diode D1 is used to prevent the power of auxiliary SMPS unit 53 from affecting that of USB hub 10. When or if the user stops operating computer main unit 1 for a specified time, the computer main unit 1 sets up a display power management signaling (DPMS) mode to save power consumption. Once the computer main unit 1 is in a DPMS mode (Step S5), a signal for the power OFF mode is transmitted to the microcomputer 54 via the downstream port of the USB hub 10. Upon recognizing the power OFF mode, the microcomputer 54 generates a signal to interrupt the operation of the main SMPS unit 53 through OFF control selector 55 at step S6.

As described above, the present invention is directed to a power control device of the display monitor using the power of the USB hub, thereby effectively saving the power of the display monitor in the power OFF mode.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may 15 be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power control device of a computer system using a universal serial bus (USB) hub for power control of a display monitor, comprising:

a power converter for converting an alternating current of the display monitor into a direct current voltage;

a main switching mode power supply unit for supplying power to the display monitor after the alternating current is converted into the direct current voltage;

a microcomputer for checking a status of a power save mode from the computer system to control operation of the main switching mode power supply unit;

an auxiliary switching mode power supply unit for supplying power to the microcomputer when no power is supplied from the universal serial bus hub;

an auxiliary controller for interrupting operation of the auxiliary switching mode power supply unit when power is supplied from the universal serial bus hub; and a main controller for interrupting operation of the main switching mode power supply unit to execute a power OFF mode according to a display power management signaling.

2. The power control device of claim 1, said universal serial bus hub comprising:

an upstream port coupled to receive data and clock signals from the computer system;

a plurality of downstream ports for sending power control signals to respective peripheral devices; and a universal serial bus controller disposed between the upstream port and the plurality of downstream ports to control mutual transmission of data between the display monitor and other peripheral devices.

3. The power control device of claim 1, wherein the power supplied from the universal serial bus hub corresponds to 5 volts.

4. The power control device of claim 1, wherein said microcomputer has an input connected to said auxiliary switching mode power supply unit and to said USB hub for receiving power therefrom.

5. The power control device of claim 4, further comprising a diode connected between said microcomputer and said USB hub for preventing power from said auxiliary switching mode power supply unit from affecting power of said USB hub.

6. The power control device of claim 1, further comprising a diode connected between said microcomputer and said USB hub for preventing power from said auxiliary switching mode power supply unit from affecting power of said USB hub.

7. A power control method for use in a power control device of a computer system using a universal serial bus hub for power control of a display monitor, comprising the steps of:

activating a main switching mode power supply of a power control device comprised of a main switching mode power supply unit supplying power to a display monitor, a microcomputer, and an auxiliary switching mode power supply unit supplying power to the microcomputer;

activating said auxiliary switching mode power supply unit;

determining whether power is supplied from a universal serial bus port to the display monitor;

interrupting operation of the auxiliary switching mode power supply when the power of the universal serial bus hub is supplied;

determining whether to use a power OFF mode; and switching the main switching mode power supply off when it is determined that the power OFF mode is to be used.

8. The power control method of claim 7, said universal serial bus hub comprising:

an upstream port coupled to receive data and clock signals from the computer system;

a plurality of downstream ports for sending power control signals to respective peripheral devices; and a universal serial bus controller disposed between the upstream port and the plurality of downstream ports to control mutual transmission of data between the display monitor and other peripheral devices.

9. The power control method of claim 4, wherein the power supplied from the universal serial bus hub corresponds to 5 volts.

10. A power control device of a computer system using a universal serial bus (USB) hub for power control of a display monitor, comprising:

a rectifier for converting an alternating current into a direct current voltage;

a main power supply unit for supplying power from the rectifier to the display monitor;

a microcomputer for checking a status of a power save mode from the computer system to control operation of the main power supply unit;

an auxiliary power supply unit for supplying power from the rectifier to the microcomputer when no power is supplied from the universal serial bus hub;

an auxiliary controller for interrupting operation of the auxiliary power supply unit when power is supplied from the universal serial bus hub; and a main controller for interrupting operation of the main power supply unit to execute a power OFF mode according to a display power management signaling.

11. The power control device of claim 10, said universal serial bus hub comprising:

an upstream port coupled to receive data and clock signals from the computer system;

a plurality of downstream ports for sending power control signals to respective peripheral devices; and a universal serial bus controller disposed between the upstream port and the plurality of downstream ports to control mutual transmission of data between the display monitor and other peripheral devices.

12. The power control device of claim 10, wherein the power supplied from the universal serial bus hub corresponds to 5 volts.

13. The power control device of claim 11, wherein the power supplied from the universal serial bus hub corresponds to 5 volts.

14. The power control device of claim 10, wherein said microcomputer has an input connected to said auxiliary power supply unit and to said USB hub for receiving power therefrom.

15. The power control device of claim 14, further comprising a diode connected between said microcomputer and said USB hub for preventing power from said auxiliary power supply unit from affecting power of said USB hub.

16. The power control device of claim 10, further comprising a diode connected between said microcomputer and said USB hub for preventing power from said auxiliary power supply unit from affecting power of said USB hub.

* * * * *